May 9, 1944.   B. G. CARLSON   2,348,603
HOUSING AND CAGING UNIT ASSEMBLY FOR GYROS
Filed Jan. 6, 1943

INVENTOR.
BERT G. CARLSON
BY
Frank H. Harmon
ATTORNEY

Patented May 9, 1944

2,348,603

UNITED STATES PATENT OFFICE 2,348,603

HOUSING AND CAGING UNIT ASSEMBLY FOR GYROS

Bert G. Carlson, Erieside, Ohio, assignor to Jack & Heintz, Inc., Bedford, Ohio, a corporation of Ohio Application January 6, 1943, Serial No. 471,404

6 Claims. (Cl. 74—5)

This invention relates in general to gyro apparatus and more particularly to new and novel means for caging the gyro.

One of the primary objects of the invention is to provide an improved caging device wherein the manual force applied in caging the gyro is resiliently opposed to cushion the shock attending the caging operation and whereby this resilient opposing force may be utilized to automatically return the gyro to uncaged position upon release of the manual force in order to eliminate inadvertent flying with the gyro caged and thus eliminate breakage or damage to the supports for the gyro resulting in unnecessary and excessive bearing loads caused by a precessed caged gyro.

Another object is to provide a spring detent for the caging device that will hold the gyro caged when set but which will yield under the force of a precessed spinning gyro wheel to allow the gyro to automatically uncage itself under the action of a return spring. To this end it is proposed to provide a caging mechanism that will lock the gyro erect and keep it from bumping around in its cage while the gyro wheel is not running. After the gyro wheel is run up to proper operating speed, a slight precession on the gyro made by a lateral or vertical movement of the air craft will spring the automatic release and completely uncage the gyro. Thus only one operation will be required to manually cage or uncage the gyro. Rotating the knob in one direction will cage the gyro and rotation of the knob manually or automatically in the other direction will uncage the gyro.

With the foregoing and other objects in view, the invention resides in the combination of parts and in the details of construction hereinafter set forth in the following specification and appended claims, certain embodiments thereof being illustrated in the accompanying drawing, in which:

Figure 1:
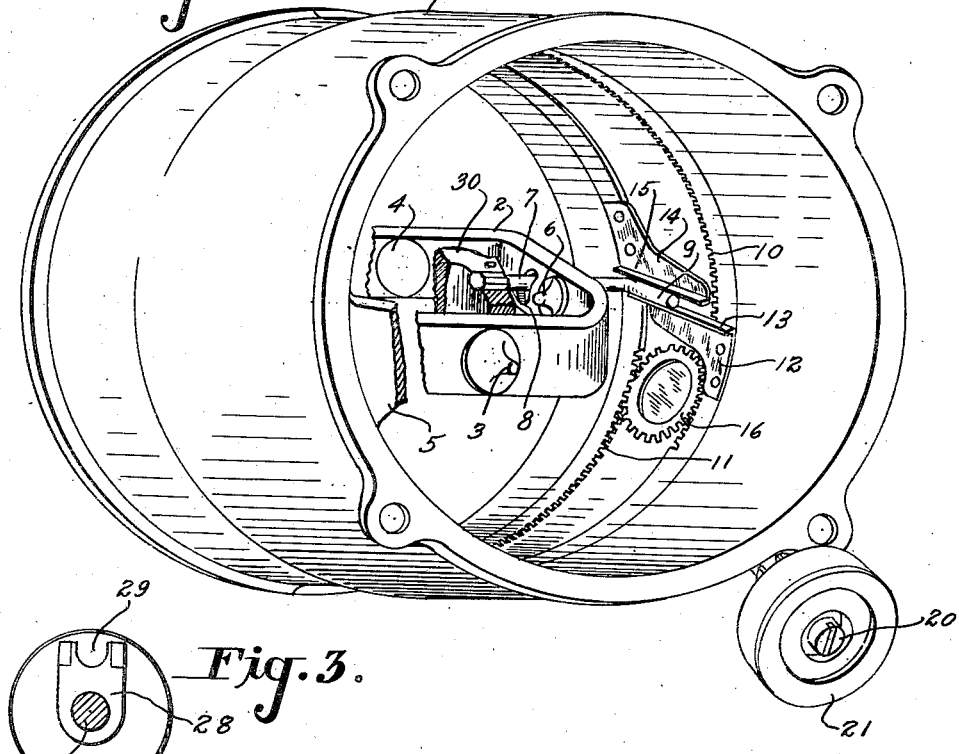
Figure 1 is a view in perspective showing the gyro box, the caging mechanism and hand control and the supporting gimbal for the gyro.
Figure 3:
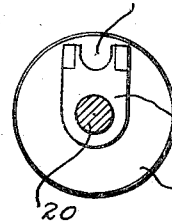
Figure 3 is a view in section of the detent recess taken along line 3—3 of Figure 2.

Referring more particularly to the drawing, the box 1 shown in Figure 1, is for housing a gyro horizon indicator. The gimbal frame 2 has two trunnions 3 and 4, trunnion 3 to engage one support and trunnion 4 to engage another support carried by the box in a conventional manner. One of such supports for trunnion 3 is shown at 5 but shown broken away for purposes of clarity in the illustration of the remaining structure. The horizon gyro is also omitted from the drawing but is to be supported in the usual manner by two trunnions, one of which is shown at 6, at right angles to trunnions 3 and 4.

Carried by the usual gyro wheel enclosing housing 30 is an indicating arm 7 riding in the usual small arcuate slot 8 and which arm in the present case is bent at right angles to provide an extension 9.

The caging device includes two sets of ring gears 10 and 11 which are slidably fitted in suitable grooves in the cylindrical box 1. Secured to gear 10 is a plate 12 having a flange 13 and secured to gear 11 is a plate 14 having a flange 15 for jointly engaging the opposite sides of arm 9 in the manner shown in Figure 1. Such engagement effects the caging of the gyro through the connection of arm 7 to the gyro housing and the riding of arm 7 in the gimbal slot 8.

The ring gears 10 and 11 are jointly operated in opposite directions by gear 16 so as to bring flanges 15 and 13 into and out of engagement with arm 9 for caging and uncaging of the gyro respectively. It has been found in previous practice that a positive rigid operation of gear 16 unopposed by any resilient force to rotate gears 10 and 11 and their plates into positive caging engagement with the gyro often creates such a shock to the gimbal frame, due to the opposing force of gyro precession, that warping, fracture or breakage of the gyro gimbal supports results. In order to eliminate the possibility of such an occurrence, the bevel gear 17, for meshing with bevel gear 18 carried by the same shaft 19 as gear 16 for rotating the latter, is carried by a manually rotatable shaft 20 with a hand knob 21. Shaft 20 extends through a barrel 22 secured to the box 1 and is provided with an enlarged portion 23 to which one end of a coil spring 24 is secured. The other end of spring 24 is secured to the barrel 22. Thus, a clockwise manual rotation of hand knob 21, to effect a caging of the gyro as shown in Figure 1, effects a winding up of spring 24 and upon a release of the manual turning of hand knob 21 the stored up energy in spring 24 brings about a reverse movement of the gear train to automatically uncage the gyro.

Figure 2:
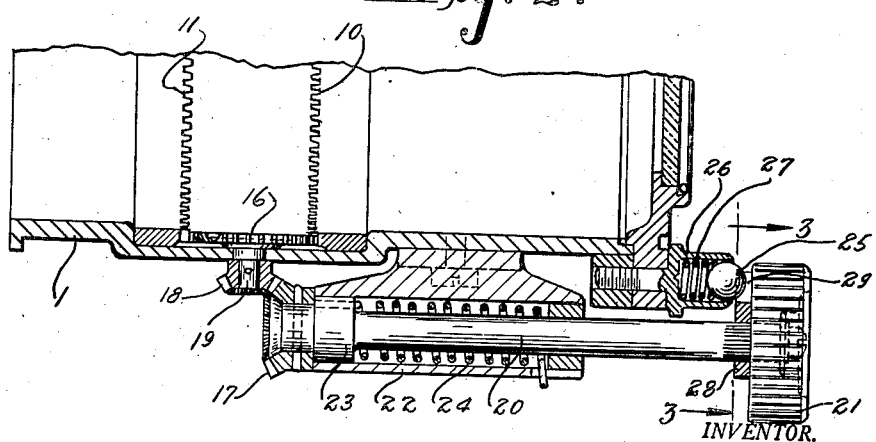
Figure 2 is an enlarged detail fragmentary view in longitudinal section taken through the box, the caging gears and the hand control and detent for the caging device.

Now in order to permit the operator to maintain the gyro in caged position, there is provided a spring detent. This includes a confined ball 25 carried in a casing 26 and resiliently urged outwardly by a compression coil spring 27. Shaft 20 carries a small plate 28 having a U-shaped recess 29 adapted to be engaged by the detent ball 25, as shown in Figure 2, which represents the position assumed when the gyro is in caged position and the remainder of the assembly assumes the position and relationship shown in Figure 1.

It is to be borne in mind that the caging operation of the gyro whether the gyro wheel is spinning or at rest is against the action of spring 24 the stored-up energy in which readily returns the gyro to uncaged position upon release of the knob 21. Moreover, after the gyro wheel is run up to speed, a slight precession on the gyro made by a lateral or vertical movement of the aircraft will exert such a force that will overcome the action of spring 27 on the ball 25 and allow the plate 28 with its recess 29 to ride over the ball and thus spring the automatic release and permit spring 24 to completely uncage the gyro. Thus the forces may be readily so accounted for that the detent will provide for a positive holding of the assembly in caged position as long as the gyro wheel is not spinning but yield to release the knob 21 and shaft 20 to the action of spring 24 under the force of a precessing spinning gyro wheel. Under such an arrangement the inadvertence on the part of the operator of neglecting to uncage the gyro will be taken care of by an automatic uncaging thereof when the spinning gyro precesses.

I claim:

1. In a caging means for a gyro having a housing, a two degree freedom gimbal support and a stationary box for supporting said gimbal, means for clamping said gyro housing in caged position and gear operated means for operating said clamping means, manual means for operating said gear operated means and resilient means for opposing said manual means, said resilient means being adapted to automatically return said clamping means out of clamping position and return said gyro to uncaged position upon manual release of said manual means.

2. In a caging means for a gyro having a housing, a two degree freedom gimbal support and a stationary box for supporting said gimbal, means for clamping said gyro housing in caged position and gear operated means for operating said clamping means, manual means for operating said gear operated means and resilient means for opposing said manual means, said resilient means being adapted to automatically return said clamping means out of clamping position and return said gyro to uncaged position upon manual release of said manual means and a spring operated detent means for holding said manual means in position when operated to the extent necessary for full caging of said gyro.

3. In a caging means for a gyro having a housing, a two degree freedom gimbal support and a stationary box for supporting said gimbal, means for clamping said gyro housing in caged position and gear operated means for operating said clamping means, manual means for operating said gear operated means and resilient means for opposing said manual means, said resilient means being adapted to automatically return said clamping means out of clamping position and return said gyro to uncaged position upon manual release of said manual means and a spring operated detent means for holding said manual means in position when operated to the extent necessary for full caging of said gyro, said detent being adapted to release said manual means upon manual operation thereof and also upon the exertion of a force resulting from a predetermined extent of precessing of the gyro when its wheel is spinning.

4. In a caging means for a gyro having a housing, a two degree freedom gimbal support and a stationary cylindrical box for supporting said gimbal, an arm carried by said housing and extending through a slot in said gimbal, means including a pair of rings rotatable in said box and carrying plates to releasably engage said arm for clamping said gyro housing in caged position, said rings having gears formed therein and a gear train for engaging said ring gears to rotate said rings in opposite directions, manual means including a rotatable shaft for operating said gear operated means and resilient means including a spring engaging said shaft and its support for opposing the positive rotation of said shaft in the direction for caging, said resilient means being adapted to automatically return said clamping means out of clamping position and return said gyro to uncaged position upon manual release of said manual means.

5. In a caging means for a gyro having a housing, a two degree freedom gimbal support and a stationary cylindrical box for supporting said gimbal, an arm carried by said housing and extending through a slot in said gimbal, means including a pair of rings rotatable in said box and carrying plates to releasably engage said arm for clamping said gyro housing in caged position, said rings having gears formed therein and a gear train for engaging said ring gears to rotate said rings in opposite directions, manual means including a rotatable shaft for operating said gear operated means and resilient means including a spring engaging said shaft and its support for opposing the positive rotation of said shaft in the direction for caging, said resilient means being adapted to automatically return said clamping means out of clamping position and return said gyro to uncaged position upon manual release of said manual means and a spring operated detent means for holding said manual means in position when operated to the extent necessary for full caging of said gyro.

6. In a caging means for a gyro having a housing, a two degree freedom gimbal support and a stationary cylindrical box for supporting said gimbal, an arm carried by said housing and extending through a slot in said gimbal, means including a pair of rings rotatable in said box and carrying plates to releasably engage said arm for clamping said gyro housing in caged position, said rings having gears formed therein and a gear train for engaging said ring gears to rotate said rings in opposite directions, manual means including a rotatable shaft for operating said gear operated means and resilient means including a spring engaging said shaft and its support for opposing the positive rotation of said shaft in the direction for caging, said resilient means being adapted to automatically return said clamping means out of clamping position and return said gyro to uncaged position upon manual release of said manual means and a spring operated detent means for holding said manual means in position when operated to the extent necessary for full caging of said gyro, said detent being adapted to release said manual means upon manual operation thereof and also upon the exertion of a force resulting from a predetermined extent of precessing of the gyro when its wheel is spinning.

BERT G. CARLSON.